Nov. 15, 1938.  H. B. DENMAN  2,136,734
LAMINATED GASKET
Filed Nov. 30, 1934
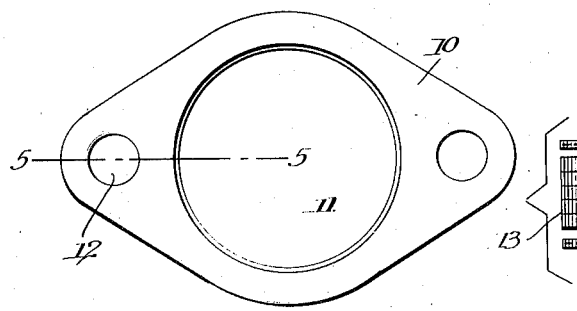
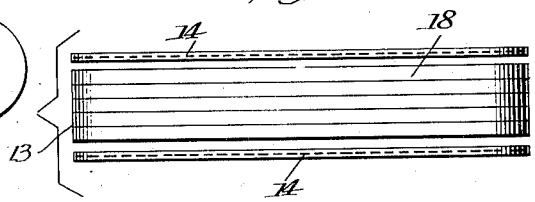
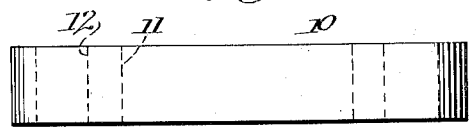
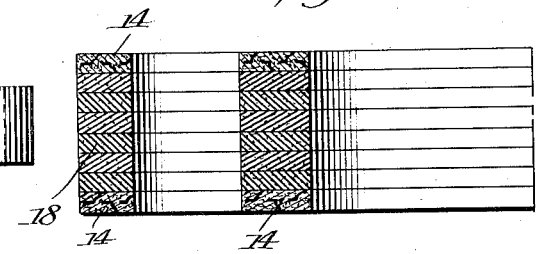
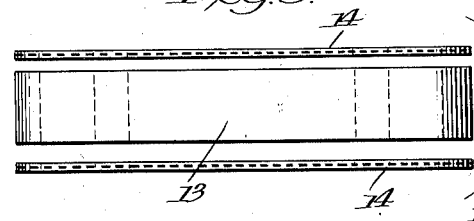
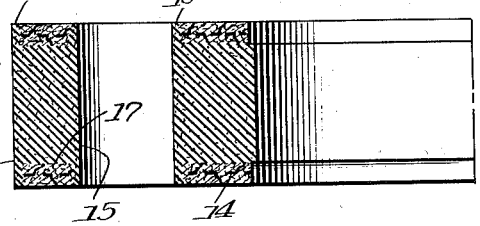
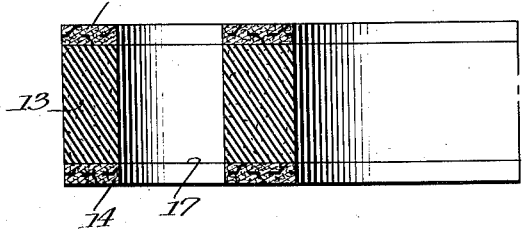
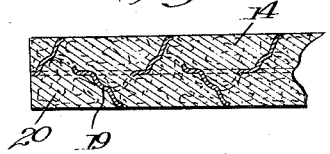
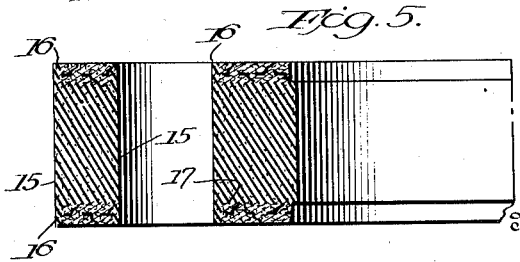
Inventor
Harry B. Denman
By Cushman, Darby, & Cushman
Attorneys Patented Nov. 15, 1938

2,136,734

UNITED STATES PATENT OFFICE 2,136,734

LAMINATED GASKET

Harry B. Denman, Birmingham, Mich., assignor to Detroit Gasket & Manufacturing Company, Detroit, Mich., a corporation of Michigan Application November 30, 1934, Serial No. 755,483

2 Claims. (Cl. 288—1)

The present invention relates to gaskets particularly useful in association with automotive engines, but equally applicable for sealing all types of joints.

An important feature of the invention resides in its integral character, that is, the gasket consists of an integral layer which is interposed between the joint surfaces, as for example between the carburetor and manifold, and does not require the interposition of separate, i. e. unconnected superposed gasket layers adjacent the joint surfaces as now required and customary with certain types of carburetor manifold gaskets.

A further object of the invention is to provide a gasket which may be formed to have a varied range or coefficient of flexibility and resiliency varying from extreme pliability and resilience to a hardness resembling hard rubber. The gasket is possessed of high tensile strength and is resistant to the action of heat, water, gases and mineral oils; in other words to all of the various influences surrounding the normal operation of an internal combustion engine.

Referring to the drawing,

Figure 1 is a top elevation of a representative gasket made in accordance with this invention.

Figure 2 is a side elevation.

Figure 3 is a side elevation with the components of the gasket shown in separated relation.

Figure 4 is a sectional view showing the components of the gasket in position.

Figure 5 is a sectional view showing the finally completed gasket.

Figure 6 is a side elevation of a modification.

Figure 7 is a sectional view of the gasket shown in Figure 6 with the components in their superposed relation.

Figure 8 is a sectional view of the final product and similar to Figure 5, and

Figure 9 is a sectional view of a layer of gasket material made in accordance with the United States Patent 1,776,140.

Referring to the drawing the numeral 10 indicates a gasket, for example, one suitable for use between the carburetor and intake manifold of an internal combustion engine. The gasket has the opening 11 and the bolt holes 12. Other suitable sizes and shapes of gaskets are, of course, employed at various points on the engine and the present view is purely illustrative. While the gasket is particularly designed for automotive use, it serves with equal success for sealing joints of various types.

Referring to Figure 3, the gasket is produced by mixing together in a suitable rubber mill a rubber mixture comprising rubber and asbestos or comminuted cork or both. To this is added suitable vulcanizing and accelerating and activating ingredients as well understood in the art. The rubber mixture after being prepared in the rubber mill is extruded to the form shown for example in Figure 1 or any desired size and shape; the rubber mixture also is formed into sheets from which gaskets of suitable size and shape will be cut or stamped. Where the material is extruded, the tube is cut off to give predetermined desired thickness and, of course, where the gasket is punched from a sheet, the sheet will be controlled to the proper gauge or thickness. The unvulcanized body produced either by extrusion and cutting or sheeting and punching is indicated in Figure 3 at 13. There is then placed on one or both sides of the core or body 13 a layer of gasket material 14, as shown in detail in Figure 9 and which is of the type shown and described in the United States Patent 1,776,140. This gasket material comprises a layer of asbestos or other cushion material 20 upon both sides as shown or upon one side only, of a layer of metal insert material 19. The insert material is provided with projections which are embedded in the cushion material as shown. Referring to Figure 3, there is illustrated the superposed relation of the layer 14 and the layer or core 13. In the particular instance shown, two layers 14 are utilized.

The unvulcanized core having the superposed or surface layers 14 as shown in Figure 4 is now vulcanized under heat and pressure in a suitable mold and there is produced a homogeneous gasket as shown in Figure 5. In the vulcanizing operation the rubber appears to flow and forms a skin 15 on the interior walls of the openings 11, 12 and on the side of the gasket, which skin extends in some cases slightly over upon the margin of the gasket surface as at 16. This skin or envelope is continuous about the walls of the openings and the exposed edge of the gasket and acts to bond the layers 14 to the core 13. In addition, the vulcanizing action results in substantially integral adhesive union between the surfaces of the layers 14 and the surfaces of the core as at 17, i. e., the layer 13 is vulcanized and the layer or layers 14, as the case may be, are vulcanized to the core. There is produced thus a substantially integral gasket having an inner and relatively thick core of rubber-asbestos or rubber comminuted cork or rubber-asbestos-cork, and surface layers of metal combined with asbestos or other cushion insulating material. This gasket is resilient and flexible as required since these qualities of course are easily regulable, in that a product having extreme pliability and flexibility can be produced up to one which is substantially rigid and not unlike hard rubber or a molded resin. The gasket is insulative since there is a substantial percentage of asbestos present in the core and since the layer 14 includes an insulating material layer or layers as described in the aforesaid patent.

Referring to Figure 6, the core 13 is produced by building up a plurality of relatively thin layers 18 of a rubber mixture as heretofore described, to the desired thickness, superposing thereon a layer or layers of gasket material 14 as shown in Figure 7 and vulcanizing to produce the integral product having a skin 15 shown in Figure 8, which is precisely like that shown in Figure 5, the layers 18 assuming an integral state.

All of the gaskets are characterized by being substantially integral in that the layers 14 are adhesively united to the core throughout their surfaces as shown at 17 by reason of vulcanization and a continuous smooth skin, film or envelope is produced extending about the entire edge portions of the gasket both interiorly and exteriorly as shown at 15. This skin is important in that it completely seals the gasket both on the exposed edges and the walls of the opening 11 and bolt holes 12. Hence, with a continuous film, the possibility of disintegration or tearing or rupture is completely avoided.

I may use as my cushion material asbestos, asbestine, comminuted cork, synthetic resin, millboard or other similar insulating material.

The various layers may be secured together by grommets, staples, a cement or by vulcanization or other securing means.

Various modifications may be made in the gaskets, all of which are comprehended in the claims appended hereto.

I claim:

1. A gasket comprising a layer of rubber composition having on one exposed surface, a layer formed of a metal insert and cushion material layers on each side thereof, said insert having projections embedded in said cushion material layers, the rubber composition layer and the metal insert-cushion material layer being secured together.

2. A gasket in accordance with claim 1 in which a metal insert cushion material layer is secured to each side of the rubber composition layer.

HARRY B. DENMAN.